(12) United States Patent
Alaman Aguilar et al.

(10) Patent No.: US 12,337,416 B2
(45) Date of Patent: *Jun. 24, 2025

(54) PROCESS FOR PRODUCING A HOTPLATE FOR A HOB

(71) Applicant: BSH Hausgeräte GmbH, Munich (DE)

(72) Inventors: Jorge Alaman Aguilar, Saragossa (ES); Miguel Angel Buñuel Magdalena, Saragossa (ES); Francisco Javier Ester Sola, Saragossa (ES); Jose Ramon Garcia Jimenez, Augsburg (DE); Jose Andres Garcia Martinez, Saragossa (ES); Pilar Perez Cabeza, Saragossa (ES); Fernando Planas Layunta, Saragossa (ES)

(73) Assignee: BSH Hausgeräte GmbH, Munich (DE)

( * ) Notice: Subject to any disclaimer, the term of this patent is extended or adjusted under 35 U.S.C. 154(b) by 634 days.

This patent is subject to a terminal disclaimer.

(21) Appl. No.: 16/406,055

(22) Filed: May 8, 2019

(65) Prior Publication Data

US 2019/0329358 A1    Oct. 31, 2019

Related U.S. Application Data

(63) Continuation of application No. 13/990,807, filed as application No. PCT/IB2011/055634 on Dec. 13, 2011, now Pat. No. 10,350,709.

(30) Foreign Application Priority Data

Dec. 16, 2010  (ES) ................ ES201031856

(51) Int. Cl.
*B23K 26/36*     (2014.01)
*B23K 26/0622*   (2014.01)
(Continued)

(52) U.S. Cl.
CPC ........ *B23K 26/362* (2013.01); *B23K 26/0622* (2015.10); *B23K 26/361* (2015.10);
(Continued)

(58) Field of Classification Search
CPC .... B23K 26/06; B23K 26/0622; B23K 26/36; B23K 26/361; B23K 26/362; B23K 26/364; B23K 26/40; B23K 26/55; B23K 26/57
See application file for complete search history.

(56) References Cited

U.S. PATENT DOCUMENTS 4,330,352 A   5/1982  Grimes et al.
4,464,681 A   8/1984  Jacobs et al.
(Continued)

FOREIGN PATENT DOCUMENTS

JP   2005097108 A  *  4/2005  ............ C03B 13/01
WO   0061364       10/2000

OTHER PUBLICATIONS

International Search Report PCT/IB2011/055634 dated Mar. 27, 2012.
National Search Report ES 201031856 dated Apr. 2, 2013.

*Primary Examiner* — Geoffrey S Evans
(74) *Attorney, Agent, or Firm* — Michael E. Tschupp; Andre Pallapies; Brandon G. Braun

(57) ABSTRACT

In a method for embodying a hotplate for a hob, at least one metallic layer and a further layer under the metallic layer are formed on an underside of the hotplate. After applying the at least one metallic layer and the further layer, at least one region of the metallic layer is changed by a laser light of a laser beam so that the further layer is recognized when viewing the hob on a topside.

22 Claims, 1 Drawing Sheet

(51) Int. Cl.
  *B23K 26/361* (2014.01)
  *B23K 26/362* (2014.01)
  *B23K 26/364* (2014.01)
  *B23K 26/40* (2014.01)
  *B23K 26/55* (2014.01)
  *B23K 26/57* (2014.01)
  *C03C 17/36* (2006.01)
  *C03C 23/00* (2006.01)
  *F24C 15/10* (2006.01)
  *B23K 103/00* (2006.01)
  *B23K 103/16* (2006.01)

(52) U.S. Cl.
  CPC ............ *B23K 26/364* (2015.10); *B23K 26/40* (2013.01); *B23K 26/55* (2015.10); *B23K 26/57* (2015.10); *C03C 17/36* (2013.01); *C03C 17/3605* (2013.01); *C03C 17/3684* (2013.01); *C03C 23/0025* (2013.01); *F24C 15/10* (2013.01); *B23K 2103/172* (2018.08); *B23K 2103/50* (2018.08); *C03C 2218/32* (2013.01); *C03C 2218/36* (2013.01)

(56) References Cited

U.S. PATENT DOCUMENTS

| | | |
|---|---|---|
| 4,678,690 A | 7/1987 | Palmer et al. |
| 4,940,690 A | 7/1990 | Skees |
| 5,240,778 A | 8/1993 | Quick et al. |
| 5,338,615 A | 8/1994 | Quick et al. |
| 5,468,532 A | 11/1995 | Ho et al. |
| 5,667,858 A | 9/1997 | Pokorny |
| 5,770,283 A | 6/1998 | Gosselin et al. |
| 5,773,112 A | 6/1998 | Tachikawa et al. |
| 5,851,614 A | 12/1998 | Buck |
| 5,866,249 A | 2/1999 | Yarusso et al. |
| 5,884,425 A | 3/1999 | Baldwin |
| 5,977,263 A | 11/1999 | Phillips |
| 6,660,980 B2 | 12/2003 | Nagata |
| 7,763,832 B2 | 7/2010 | Striegler |
| 8,592,729 B2 | 11/2013 | Nelson |
| 8,982,080 B2 | 3/2015 | Alaman Aguilar |
| 2003/0087106 A1* | 5/2003 | De Witzmann ........... C03C 8/20 428/432 |
| 2004/0238506 A1 | 12/2004 | Petit |
| 2005/0224491 A1* | 10/2005 | Vilato ..................... C03C 17/04 219/443.1 |
| 2005/0274263 A1* | 12/2005 | Ghislain ............. A47J 37/0676 99/372 |
| 2007/0202343 A1* | 8/2007 | Sprenger ............... C03C 17/006 428/432 |
| 2007/0264421 A1 | 11/2007 | Meier et al. |
| 2008/0190409 A1 | 8/2008 | Demol et al. |
| 2008/0264931 A1 | 10/2008 | Vilato et al. |
| 2009/0046757 A1 | 2/2009 | Miyairi et al. |
| 2011/0240616 A1 | 10/2011 | Osako et al. |
| 2012/0125315 A1 | 5/2012 | Alonso Esteban et al. |

* cited by examiner

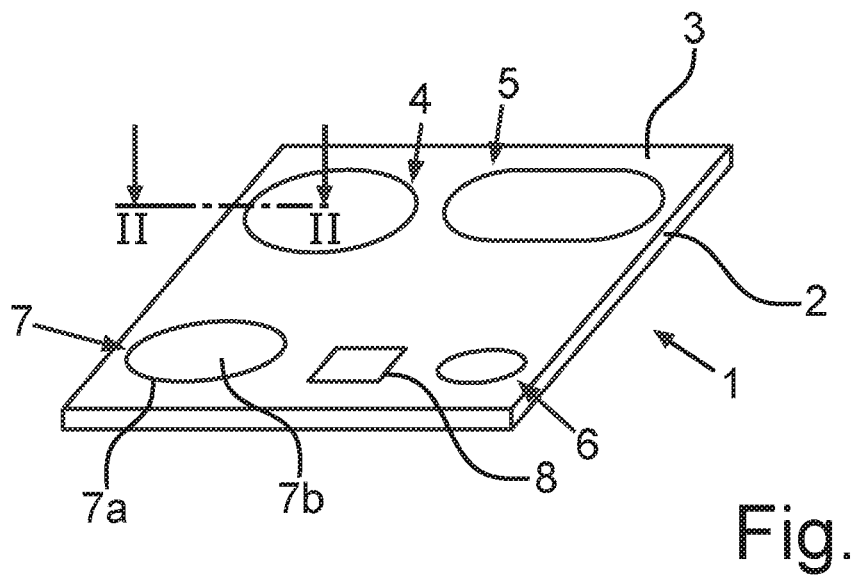
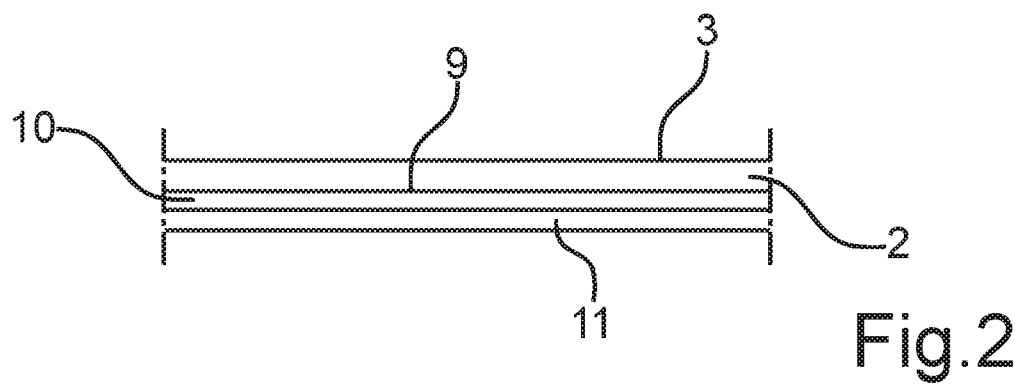
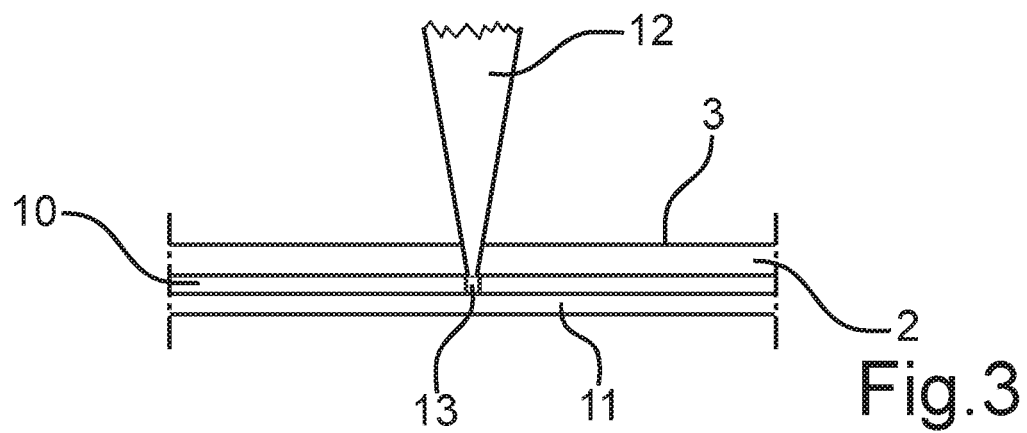

PROCESS FOR PRODUCING A HOTPLATE FOR A HOB

CROSS-REFERENCE TO RELATED APPLICATIONS

This application is a Continuation of copending U.S. application Ser. No. 13/990,807, filed May 31, 2013, entitled "PROCESS FOR PRODUCING A HOTPLATE FOR A HOB," the entire contents of which is incorporated herein by reference in its entirety.

BACKGROUND OF THE INVENTION

The invention relates to a method for embodying a hotplate for a hob, in which at least one metallic layer and a further layer under the metallic layer are embodied on an underside of the hotplate.

With hobs which have glass plates or plates made of ceramic as hotplates, a metallic layer or a bond of layers comprising a plurality of metallic layers is applied to the underside. The application by means of sputter technology is known here. Furthermore, provision can be made for at least one further layer comprising a material which differs from the metallic layer to then be applied under this at least one metallic layer when viewing the hotplate from above. This may be a layer made of a dielectric material for instance. It is also known that color coatings are applied under at least one metallic layer. In respect of the bond of layers with a number of metallic layers, an alternating sequence of a metallic layer with a dielectric layer and in turn subsequently with a metallic layer and then in turn a dielectric layer etc. can be embodied there etc.

Furthermore, it is known that such layers under the hotplate are removed in regions, wherein this can take place by means of etching for instance. In this respect, provision can also be made for corresponding recesses to be generated by a mask for instance, already upon application of the layers.

With conventional procedures for applying the layers, this frequently takes place very imprecisely, particularly if very thin lines are to be embodied as recesses of a layer. Furthermore, a further different layer is frequently also unintentionally removed and/or the recess provided during the generation can only be implemented very imprecisely.

BRIEF SUMMARY OF THE INVENTION

It is the object of the present invention to create a method for embodying a hotplate for a hob, in which the application of layers and generation of interruptions in the layers can take place in a more precise and less complex manner.

This object is achieved by a method comprising the features as claimed in claim 1.

An inventive method for embodying a hotplate for a hob provides that at least one metallic layer and a further layer under the metallic layer is embodied on an underside of the hotplate. In particular, the further layer is embodied from a material which differs from the metallic layer, in particular an electrically non-conductive material. After applying the at least two layers, the metallic layer is removed in regions by means of the laser light, so that upon examination of the hob on the topside, the further layer embodied under the metallic layer is recognized or appears. With this sequence, the entire layer structure is thus firstly embodied below the hotplate in a special specification and only then is the metallic layer removed in regions. This takes place very specifically by means of a laser light. A procedure of this type allows the precision of the removal of the metallic layer to be improved. Furthermore, impairment of the further layer embodied therebelow can be minimized.

A color coating, in particular a dielectric color coating, is preferably embodied as a further layer. A color coating is understood to mean the layer which has a different color for the purpose of a metallic optical impression.

Provision is preferably made for the removal of the metallic layer only then to be implemented after complete embodiment of all layers on the underside of the hotplate. This is particularly advantageous since attention need not be paid to corresponding recesses, initially upon application of the layers, but the layers can instead be applied very precisely with desired thickness over almost the entire surface.

It is particularly advantageous that the laser light for removing the metallic layer is irradiated so as to strike the topside of the hotplate and is radiated through the hotplate in order to be able to remove the metallic layer applied directly therebelow at least in regions. This location-specific irradiation of the laser light ensures one particular advantage in respect of the precision of the application of very thin lines on the one hand and the smallest possible negative affect on the further layer on the other hand.

Provision is preferably made for the laser beam of the laser light to focus on the topside of the hotplate.

Since usual thicknesses in hotplates of this type are approximately 4 mm and this material composition is known in respect of the ceramic material, a particularly advantageous removal effect can be achieved with the laser light by focusing on the on the point of the metallic layer.

Provision is preferably made for the metallic layer to be embodied with a thickness of less than 130 nm, in particular between 20 nm and 100 nm.

Provision is preferably made for the further layer to be embodied with a thickness of less than 250 µm, in particular between 100 µm and 200 µm.

It is particularly advantageous if the laser beam of the laser light is moved at a speed of 200 mm/s. The aforeclaimed precise removal of the metallic layer is achieved without negatively affecting a further layer embodied therebelow with the corresponding layer thickness, with the corresponding embodiment of the hotplate and with a laser light in the green wavelength range.

In this context the laser beam of the laser light is preferably generated with a pulse frequency of 110 kHz. Furthermore, it is particularly advantageous in this context if the metallic layer is removed in lines which have a line width <500 µm, in particular <400 µm. The particular precision which is required here in terms of generating thinner and narrower lines at the same time as a completely continuous removal of the metallic layer such that the further layer arranged therebelow is upwardly exposed and is no longer covered by metallic material, can be achieved with the specific procedures, as were described above.

The wavelength of the laser light preferably amounts to 532 nm.

BRIEF DESCRIPTION OF THE DRAWINGS

An exemplary embodiment of the invention is described in more detail below with the aid of schematic drawings, in which;

FIG. 1 shows a perspective representation of an exemplary embodiment of an inventively manufactured hotplate;

FIG. 2 shows a sectional representation along the sectional line II-II of a hotplate with layers embodied therebelow prior to processing with laser light; and FIG. 3 shows the sectional representation according to FIG. 3 having laser light processing provided.

DETAILED DESCRIPTION OF EXEMPLARY EMBODIMENTS OF THE PRESENT INVENTION

Identical or functionally identical elements are provided in the figures with the same reference characters.

A hob 1 is shown in FIG. 1 in a perspective representation, said hob having a hotplate 2, which is embodied from glass or ceramic. Four cooking zones 4, 5, 6 and 7 are embodied on a topside 3 of the hotplate 2 in the exemplary embodiment, upon which preparation vessels can be positioned for preparing food.

In particular, the hob 1 is an induction hob. In this respect, 4 to 7 inductors are arranged below the hob 2 in each instance below the surfaces of the cooking zones 4 to 7.

By way of example, the hob 1 also includes a control apparatus 8, which is arranged at least with sub components in the hotplate 2 and/or can be operated from the topside 3.

FIG. 2 shows a sectional representation of the hotplate 2 along the sectional line II-II, when this is still not completely manufactured. A metallic layer 10 is embodied on an underside 9 of the hotplate 2. A color coating 11 is applied below this metallic layer 10. Provision can also be made for further layers to exist. In respect of the embodiment of the hotplate 2, provision can be made for the hotplate 2 to initially be provided. The metallic layer 10 is then applied to the underside and the color coating 11 is then applied herebelow. This can take place by means of sputtering for instance. In the exemplary embodiment, the hotplate 2 comprises a thickness of approximately 4 mm. The metallic layer applied directly on the underside 9 preferably comprises a thickness between 20 nm and 100 nm. The layer thickness of the color coating 11 preferably amounts to between 100 μm and 200 μm.

Since the complete layer structure is essentially applied to the whole surface of the underside 9, a laser beam 12 is then generated with a laser. This is irradiated onto the topside 3 and/or from the topside 3 onto the hotplate 2. In particular, the irradiation of the laser light according to the laser light 12 takes place such that the laser beam 12 focuses on the topside 3. The laser light is generated with a wavelength of 532 nm. Furthermore, the laser beam 12 is moved at a speed of 2000 mm/s relative to the hotplate 2 in order to generate corresponding lines, which comprise in particular a width of 400 μm. For instance, the contours and/or surface boundaries of the cooking zones 4 to 7 are made known for instance. To this end, the metallic layer 10 is applied linearly so that when examining the hotplate 2 from the topside 3, the color coating 11 can be recognized and upwardly exposed and/or is no longer covered in a location-specific manner by the layer 10. In particular, provision is thus made for a surface boundary 7a (FIG. 1) of the cooking zone 7 to be recognized for instance in respect of the shade of color according to the color coating 11 and a circular area 7b enclosed by the contour 7a according to the metallic layer 10 through the hotplate 2. Corresponding contour formations in respect of the color differences are provided in the cooking zones 4 to 6.

As furthermore apparent in the representation in FIG. 2, when the laser beam 12 passes through the hotplate 2, the metallic layer 10 is removed completely in a very restricted and precisely defined region, namely up to the color coating 11, which is not removed by the laser beam 12 or is negatively affected to a negligible degree by the laser beam 12.

The laser beam is generated with a pulse frequency of 110 kHz.

Provision can also be made for the laser beam 12 to be generated such that the metallic layer 10 is not continuously removed at the corresponding point 13, but is instead changed in respect of material properties, but retained such that the color coating 11 arranged therebelow likewise appears therethrough and this color coating 11 is recognized in a linear region 13 when viewing the hotplate 2 from the topside 3.

The invention claimed is:

1. A method for embodying a hotplate for a hob having at least one cooking zone that is visible when viewing the hob on a topside and upon which a preparation vessel can be positioned for preparing food, the method comprising:
   providing the hotplate, wherein the hotplate is one of a glass hotplate and a ceramic hotplate;
   forming at least one metallic layer and a further layer under the at least one metallic layer on an underside of the hotplate; and
   after the forming the at least one metallic layer and the further layer, forming the at least one cooking zone on the hotplate by irradiating at least one region of the at least one metallic layer with a laser light of a laser beam directed to strike the topside of the hotplate and to radiate through the hotplate and moving the laser light with respect to the at least one region of the at least one metallic layer such that an entire layer thickness of the at least one region of the at least one metallic layer disposed between the hotplate and the further layer is completely continuously removed with each movement of the laser light so that the further layer is visible from the topside of the hotplate.

2. The method of claim 1, wherein the further layer is a color coating.

3. The method of claim 1, wherein the at least one metallic layer is formed directly on the underside of the hotplate, and wherein one of the at least one metallic layer and the further layer is formed by sputtering.

4. The method of claim 1, wherein the at least one metallic layer and the further layer under the at least one metallic layer are formed on an entire underside of the hotplate.

5. The method of claim 1, wherein the laser light is focused on the topside of the hotplate.

6. The method of claim 1, wherein the at least one metallic layer has a thickness of less than 130 nm.

7. The method of claim 1, wherein the at least one metallic layer has a thickness between 20 nm and 100 nm.

8. The method of claim 1, wherein the further layer has a thickness of less than 250 μm.

9. The method of claim 1, wherein the further layer has a thickness between 100 μm and 200 μm.

10. The method of claim 1, wherein the laser light is moved at a speed of 2000 mm/s.

11. The method of claim 1, wherein the laser light is generated with a pulse frequency of 110 kHz.

12. The method of claim 1, wherein the laser light is generated with a wavelength of 532 nm.

13. The method of claim 1, further comprising removing the at least one region of the at least one metallic layer only after the at least one metallic layer and the further layer have completely been applied on the underside of the hotplate.

14. The method of claim 13, wherein the at least one region of the at least one metallic layer is removed in lines, which have a line width of less than 500 μm.

15. The method of claim 13, wherein the at least one region of the at least one metallic layer is removed in lines, which have a line width of 400 μm.

16. A method for manufacturing a hotplate for a hob having at least one cooking zone that is visible when viewing the hob on a topside and upon which a preparation vessel can be positioned for preparing food, the method consisting essentially of:
- providing the hotplate, wherein the hotplate is one of a glass hotplate and a ceramic hotplate;
- applying at least one metallic layer on an entire underside of the hotplate;
- applying at least one dielectric color coating consecutively to an entire underside of the at least one metallic layer such that the at least one metallic layer is between the hotplate and the at least one dielectric color coating; and
- after applying the at least one metallic layer and the at least one dielectric color coating, forming the at least one cooking zone on the hotplate by applying a laser light of a laser beam to at least one region of the at least one metallic layer and moving the laser light with respect to the at least one region of the at least one metallic layer such that an entire layer thickness of the at least one region of the at least one metallic layer disposed between the hotplate and the at least one dielectric color coating is completely continuously removed with each movement of the laser light so that the at least one dielectric color coating is visible from the topside of the hotplate.

17. The method of claim 16, wherein the dielectric color coating is applied directly to the at least one metallic layer.

18. The method of claim 16, wherein the at least one metallic layer has a thickness of less than 130 nm,
wherein the further layer has a thickness of less than 250 μm,
wherein the laser light is moved at a speed of 2000 mm/s,
wherein the laser light is generated with a pulse frequency of 110 kHz,
wherein the laser light is generated with a wavelength of 532 nm, and
wherein the at least one region of the at least one metallic layer is removed in lines, which have a line width of less than 400 μm.

19. The method of claim 18, wherein the at least one metallic layer has a thickness between 20 nm and 100 nm, and
wherein the further layer has a thickness between 100 μm and 200 μm.

20. A method for forming a hotplate for a hob having at least one cooking zone that is visible when viewing the hob on a topside and upon which a preparation vessel can be positioned for preparing food, the method consisting essentially of:
- providing the hotplate, wherein the hotplate is one of a glass hotplate and a ceramic hotplate;
- applying at least one metallic layer on an entire underside of the hotplate, wherein the at least one metallic layer has a thickness of less than 130 nm;
- applying at least one further layer of dielectric material consecutively to an entire underside of the at least one metallic layer such that the at least one metallic layer is between the hotplate and the further layer, wherein the further layer has a thickness of less than 250 μm;
- after applying the at least one metallic layer and the further layer, forming the at least one cooking zone on the hotplate that is visible when viewing the hob on the topside by irradiating at least one region of the at least one metallic layer with a laser light of a laser beam having a pulse frequency of 110 kHz and directed to strike a topside of the hotplate and to radiate through the hotplate and moving the laser light at a speed of 2000 mm/s with respect to the at least one region of the at least one metallic layer such that an entire layer thickness of the at least one region of the at least one metallic layer disposed between the hotplate and the further layer is completely continuously removed in lines having a thickness of less than 500 μm with each movement of the laser light so that the further layer is recognized when viewing the hob on the topside.

21. The method of claim 20, wherein the at least one metallic layer has a thickness between 20 nm and 100 nm.

22. The method of claim 20, wherein the further layer has a thickness between 100 μm and 200 μm.

* * * * *